United States Patent [19]

Asoh

[11] Patent Number: 4,910,914
[45] Date of Patent: Mar. 27, 1990

[54] WINDOWPANE GUIDE STRUCTURE IN AUTOMOBILE DOOR ASSEMBLY

[75] Inventor: Seiichi Asoh, Higashihiroshima, Japan

[73] Assignee: Mazda Motor Corporation, Hiroshima, Japan

[21] Appl. No.: 210,841

[22] Filed: Jun. 24, 1988

[30] Foreign Application Priority Data

Jul. 7, 1987 [JP] Japan .................................. 62-169157

[51] Int. Cl.⁴ ............................................ E05D 15/10
[52] U.S. Cl. ........................................ 49/214; 49/376; 49/440
[58] Field of Search ................. 49/375, 374, 213, 214, 49/376, 440

[56] References Cited

U.S. PATENT DOCUMENTS 4,543,747 10/1985 Kaltz .................................... 49/250

FOREIGN PATENT DOCUMENTS 60-137616 9/1985 Japan .
2115470 9/1983 United Kingdom .................. 49/375

Primary Examiner—Kenneth J. dorner
Assistant Examiner—Gerald A. Anderson
Attorney, Agent, or Firm—Wenderoth, Lind & Ponack

[57] ABSTRACT

A windowpane guide structure in an automobile door assembly includes a windowpane drive mechanism for driving a windowpane up and down between closed and open positions, at least one guide rail member housed completely within the windowpane chamber defined between outer and inner door panels of the door assembly, and a slide member operatively interconnecting the windowpane and the guide rail member. The guide rail member is stationarily supported by the door assembly so as to extend substantially parallel to the direction of movement of the windowpane and is shaped and curved to permit the lower edge of the windowpane during the movement of the windowpane from the closed position towards the open position to progressively move generally straight downwards, slightly deflect towards the inner door panel and then deflect towards the outer door panel before the windowpane reaches the open position, i.e. to travel in a generally S-shaped trajectory.

16 Claims, 3 Drawing Sheets

WINDOWPANE GUIDE STRUCTURE IN AUTOMOBILE DOOR ASSEMBLY

BACKGROUND OF THE INVENTION

1. Field of the Invention

The present invention generally relates to an automobile door window assembly and, more particularly, to a windowpane guide structure for guiding a windowpane between closed and open positions.

2. Description of the Prior Art

Japanese Laid-open Utility Model Publication No. 60-137616, published Sept. 12, 1985, discloses a automobile door assembly of a type reproduced in FIG. 1 of the accompanying drawings. The prior art door assembly shown in FIG. 1 comprises a door 1 having a sandwich structure comprising inner and outer door panels defining a windowpane chamber therebetween, and a door windowpane 4 supported for movement between an upwardy shifted, closed position, in which the windowpane is exposed to the outside of the windowpane chamber, and a downwardly shifted, open position in which the door windowpane is generally completely concealed within the windowpane chamber.

A windownpane guide structure employed in the prior art door assembly is housed completely within the windowpane chamber between the outer and inner door panels forming the door 1 and comprises front and rear channel members 2 and 3 secured to either the outer door panel or the inner door panel and spaced apart from each other in the lengthwise direction of the automobile. While the front and rear channel members 2 and 3 are open towards the door windowpane 4, front and rear brackets 5 and 6 each having a plurality of slide or roller members carried thereby are secured to lower front and rear edge portions of the door windowpane 4, respectively, with the slide or roller members movably engaged in the associated channel members 2 and 3. Although not shown, the door windowpane 4 can be moved between the open and closed positions by means of either a cranking knob or a powered window regulator.

However, for maximizing the capacity of the passenger's compartment within the limited framework of an automobile to provide a comfortable ride and to contribute to a configuration of the body will appeal to potential users, some automobiles make use of a windowpane, for each door asssembly, which is curved to protrude outwardly of the passenger's compartment when the windowpane is in the closed position. According to the prior art windowpane guide structure utilizing the curved windowpane, guide rails are provided along which the windowpane is moved with its opposite side edges slidingly engaged therein either directly or through guide rollers. These guide rails are nevertheless curved to conform to the curvature of the windowpane and are fixed to one of the inner and outer door panels.

When the windowpane has a relative large degree of curvature, for a given spacing between the outer and inner door panels forming the door assembly, an upper portion of the windowpane may be left exposed outwardly of the windowpane chamber even when the door windowpane is completely moved to the open position. This is because, when the door assembly is closed an associated side still extends immediately below the door assembly in a direction longitudinally of the automobile body structure and, the outer and inner door panels are, at the bottom of the door assembly, connected together by means of a bottom trim panel secured at its opposite side edges to the bottom edges of the outer and inner door panels while extending generally diagonally upwardly from the bottom edge of the outer door panel to the bottom edge of the inner door panel so as to compliment the contour of such side still. This is also because the open position for the movement of the door windowpane is delimited at so relatively high a level above the boot floor of the automobile as to avoid any possible collision of the lowermost edge of the door windowpane against the bottom trim panel when the windowpane is moved completely to the open position.

If the space between the outer and inner door panels is large, that is if the door assembly has a relatively thickness great enough to accommodate the curvature of the windowpane, the above-discussed problems might not be encountered; however, this is not a favorable solution in terms of the layout of the automobile bodywork and interior.

SUMMARY OF THE INVENTION

The present invention has therefore been devised with a view to substantially eliminate the above-described problems inherent in the prior art door assembly and has as its essential object to provide an improved automobile door assembly wherein the windowpane guide structure is designed to minimize the protrusion of the upper portion of the door windowpane outwardly of the windowpane chamber when the door windowpane is moved to the open position while contributing to a body configuration which may appeal to potential users.

In accordance with the present invention herein disclosed, the above-described object can be accomplished by providing automobile door assembly having windowpane guide structure which comprises a windowpane drive means for driving the windowpane up and down between the closed and open positions, at least one guide rail member housed completely within the windowpane chamber between the outer and inner door panels, and a slide member operatively interconnecting the windowpane and the guide rail member. The guide rail stationarily supported by the door assembly so as to extend substantially parallel to the direction of movement of the windowpane and is shaped and curved to permit the lower edge of the windowpane during the movement of the windowpane from the closed position towards the open position to progressively move generally straight downwards, slightly deflect towards the inner door panel and then, deflect towards the outer door panel before the windowpane reaches the open position thereby following a generally S-shaped trajectory.

According to the present invention, at the open position at which the windowpane is concealed generally completely within the windowpane chamber defined between the outer and inner door panels the lowermost edge of the windowpane lies in the vicinity of the joint between the bottom edge of the outer door panel and the bottom trim panel, which joint is located at a level offset downwardly relative to a joint between the bottom edge of the inner door panel and the bottom trim panel. Therefore, the windowpane when driven towards the open position can move nearly entirely into the windowpane chamber without the lowermost edge thereof impinging the bottom trim panel that is generally inclined from the bottom edge of the outer door panel upwardly to the bottom edge of the inner door panel.

Because of the employment of the unique windowpane guide structure, the present invention is effective to minimize, or substantially completely eliminate, the protrusion of the uppermost edge of the door windowpane upwardly from the windowpane chamber when the door windowpane is moved to the open position. Therefore, a body which may appeal to potential automobile users can be effectively provided without substantially altering the design and dimensions of the existing automobile door assembly.

Preferably, the windowpane guide structure may further comprise means for supporting the curved windowpane during the movement thereof between the closed and open positions. This supporting means may comprise front and rear channel members each having a generally U-shaped cross-section housed completely within the windowpane chamber and spaced apart from each other in the lengthwise direction of the automobile with front and rear edges of the windowpane slidingly received therein. Each of the front and rear channel members is, in accordance with the present invention and in consideration of the trajectory of the lowermost edge of the curved windowpane, supported with its lower end rockable in the direction of thickness of the door assembly to accomodate the curved movement of the windowpane between the closed and open positions. For this purpose, an upper end of each channel member may be pivotably connected to the door assembly.

Also, each of the channel members may be curved to generally or substantially conform to the curvature of the curved windowpane.

DRIEF DESCRIPTION OF THE DRAWINGS

This and other objects and features of the present invention will become clear from the following description of preferred embodiments thereof made with reference to the accompanying drawings, in which.

DETAILED DESCRIPTION OF THE EMBODIMENT

Figure 2:
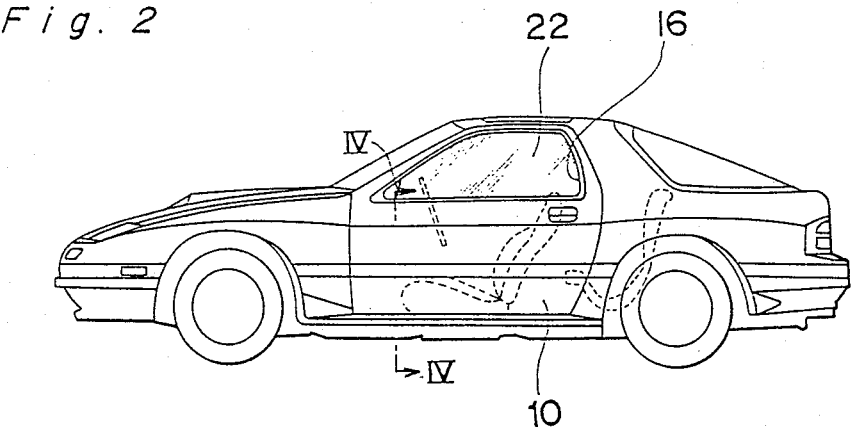
FIG. 2 is a side view of an automobile showing a door assembly to which the present invention is applicable.
Figure 1:
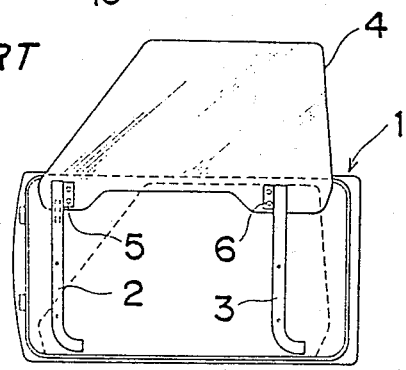
FIG. 1 is a schematic side view of the prior art door assembly.

Referring to FIG. 1, there is shown an automobile having left-hand and right-hand door assemblies, one of which is generally identified by 10 and having a windowpane 22 curved to protrude outwardly of the passenger's compartment when the windowpane is in the closed position. Each of the door assemblies 10 will now be described in detail with particular reference to FIGS. 3 to 7.

As shown, the door assembly 10 have a general sandwich structure comprising outer and inner door panels 11 and 12. The outer and inner door panels 11 and 12 are joined together by means of front and rear trim panels (not shown) and a bottom trim panel 12b so as to define a windowpane chamber 23 between the outer and inner door panels 11 and 12 and also a generally horizontally extending slot between respective upper edges 11a and 12a of the outer and inner door panels 11 and 12, through which slot the curved windowpane 22 is moved up and down between closed and open positions.

The door assembly 10 has a generally U-sectioned sash 15 having a shape similar to the shape of an inverted figure of "U" having its opposite ends 15a either integral with, or otherwise welded or bolted to, the outer door panel 11, or welded or bolted to the outer and inner door panels 11 and 12, and positioned above the slot so as to define a window opening 16.

The door assembly 10 so far described may have any known structure and, therefore, the details thereof will not be reiterated for the sake of brevity. However, in order to maximize the advantages and effects brought about by the present invention, the door assembly 10 to which the present invention is advantageously applicable is shown to have the bottom trim panel 12b inclined upwards from a bottom edge of the outer door panel 11 towards a bottom edge of the inner door panel 12, when viewed in the longitudinal direction of the automobile, while the inner door panel 12 is undersized relative to the outer door panel 11. More specifically, as shown, the bottom trim panel 12b which may be integral with the front and rear trim panels (not shown) extending upwards and generally perpendicular to the bottom trim panel 12b has one of the opposite side edges integral with the bottom edge of the inner door panel 12 and the other thereof welded to the bottom edge of the outer door panel 11 while generally inclined so as to extend upwardly from the bottom edge of the outer door pannel 11 to the bottom edge of the inner door panel 12, as clearly shown in FIG. 4.

Cooperable with the bottom trim panel 12b so inclined as hereinabove described is a respective one of side sills 17 extending lengthwise of the automobile body structure, the respective side sill 17 having a generally inclined region 17a conforming to the inclination of the bottom trim panel 12b so that, when the door assembly 10 is in position to close an access leading into the passenger's compartment, the bottom trim panel 12b may be brought into contact with the inclined region 17a of the respective side sill 17.

Reference numeral 17b represents a boot floor secured at its opposite side edges to the respective side sills 17 and having a carpet laid thereon.

The slot communicating with the windowpane chamber 13 and through which the curved windowpane 22 moves up and down between the closed and open positions is defined by and between upper edges 11a and 12a of the respective outer and inner door panels 11 and 12 which are so designed and so shaped as to converge towards each other while leaving a generally elongated space large enough to accommodate the width and thickness of the windowpane 22. The upper edges 11a and 12a of the outer and inner door panels 11 and 12 defining the slot may be lined with any suitable weatherstrips.

Figure 5:
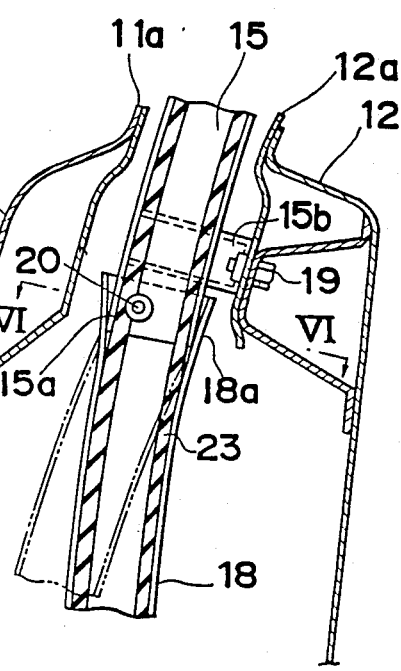
FIG. 5 is a fragmentary sectional view, on a further enlarged scale, of a portion of the door assembly shown in FIG. 4.
Figure 6:
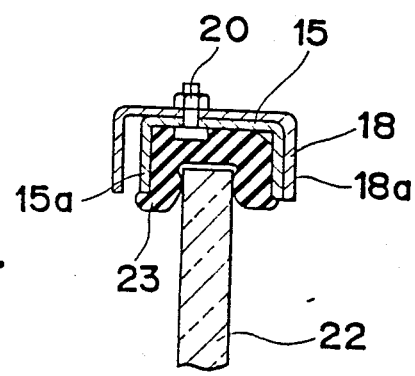
FIG. 6 is a cross-sectional view taken along the line VI—VI in FIG. 5.

As can be understood from FIG. 6, the sash 15 has a generally U-shaped cross-section open towards the window opening 16 and extends generally immediately above the slot so that, when the windowpane 22 is in the closed position closing the window opening 16, the sash 15 can sealingly receive therein a generally U-shaped peripheral edge of the windowpane 22. As illustrated, the opposite ends 15a of the sash 15 are inserted a predetermined distance into the windowpane chamber 13 through the slot and are in turn rigidly secured to the inner door panel 12 through brackets 15b bolted at 19 to respective brackets that are secured to the upper edge of the inner door panel 12 so as to protrude into the windowpane chamber 13 as clearly shown in FIG. 5.

Within the windowpane chamber 13, a pair of elongated channel members generally identified by 18, each are curved to conform to the curvature of the curved windowpane 22 and to have a correspondingly curved guide groove defined over the entire length thereof. The channel members 18 are spaced apart from each other and positioned on respective sides of the windowpane 22 with opposite side edge portions of the windowpanes 22 slidingly engaged in the respective guide grooves in the channel members 18 particularly when the windowpane 22 is in the open position. Each of the channel members 18 having top and bottom ends, only the top end being identified by 18a, is supported within the windowpane chamber 13 for oscillatory movement about a pivot axis located in the top end 18a thereof so as to permit the bottom end thereof to move in a direction associated with the thickness of the door assembly 10 or with the width of the automobile body structure.

More specifically, each channel member 18 has its top end 18a coupled to an associated end 15a of the sash 15 in overlapping relationship with the end 15a positioned inside the top end 18a of the channel member 18 and is pivotally connected thereto by means of a bolt-and-nut generally identified by 20. The channel members 18 may in essence constitute respective extensions of the opposite ends 15a of the sash 15 that extend down from such sash ends 15a deep into the windowpane chamber 13 and are operable to slidingly support the opposite side edge portions of the windowpane 22 during the movement of the windowpane 22 towards the open position. Thus, it will readily be seen that the channel members 18 are supported for oscillatory motion about respective pivot points provided by the respective bolt-and-nuts 20.

In order to facilitate the oscillatory motion of each of the channel members 18 about the pivot 20 point without interfering with the associated end 15a of the sash 15, a pair of side walls of the respective channel member 18 adjacent the top end 18a thereof flare outwardly away from each other as clearly shown in FIG. 5.

A generally U-sectioned continuous weatherstrip 23, or an equivalent sealing member, inside the sash 15 and the channel members 18, extends from the bottom end of one of the channel members 18 to the bottom end of the other of the channel members 18 by way of the sash 15, the function of the weatherstrip 23 being well known to those skilled in the art.

Figure 3:
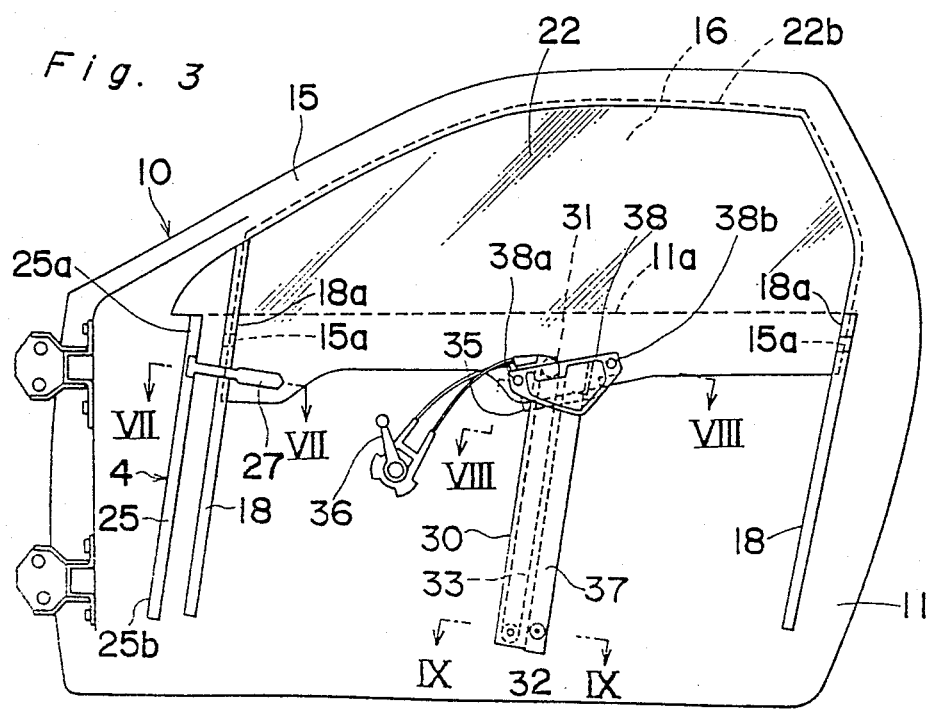
FIG. 3 is a schematic side view, on an enlarged scale, of the door assembly embodying the present invention.

The windowpane guide structure according to the present invention also comprises at least one guide rail member 25 housed completely within the windowpane chamber between the outer and inner door panels, and a slide member operatively interconnecting the curved windowpane 22 and the guide rail member 25. The guide rail member 25 has a generally U-shaped cross-section having a guide groove 25c defined therein so as to confront the adjacent channel member 18 and is fixedly carried by the inner door panel 12 by means of any suitable support means such as, for example, brackets, so as to extend generally parallel to any one of the channel members 18 as seen in FIG. 3. The guide rail member 25 so carried by the inner door panel 12 has an upper end 25a located in the vicinity of the pivot point 20 of the adjacent channel member 18 and a lower end 25b located deep within a generally V-shaped cavity defined by and between the bottom edge of the outer door panel 11 and the bottom trim panel 12b.

Figure 4:
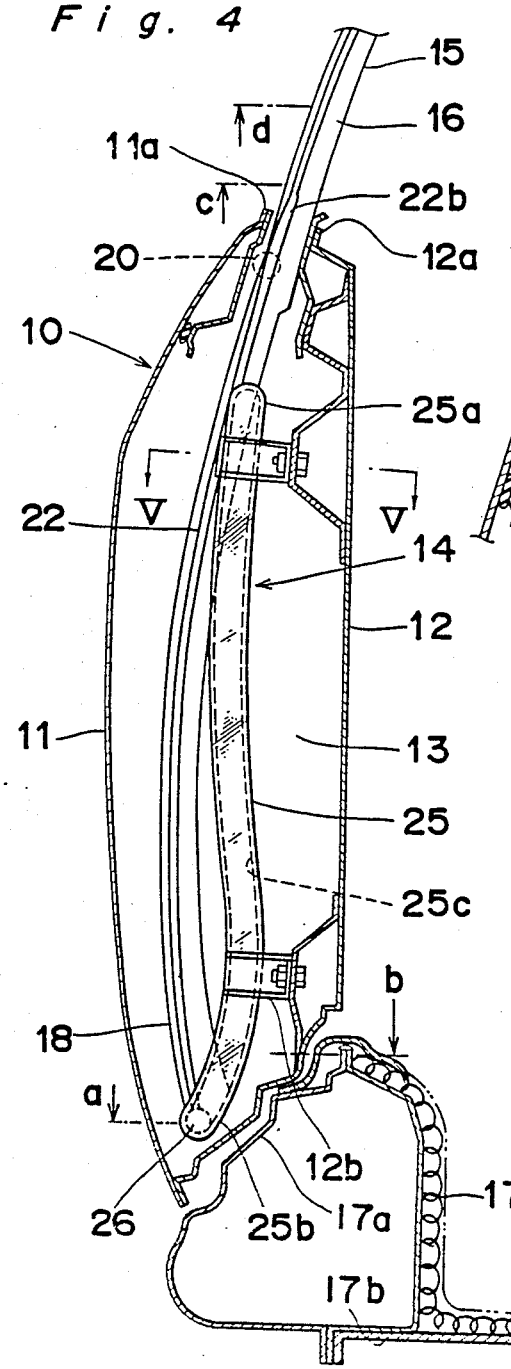
FIG. 4 is a cross-sectional view, on an enlarged scale, taken along the line IV—IV in FIG. 1.

As illustrated, the guide rail member 25 is positioned on one side of the left-hand channel member 18, as viewed in FIG. 3, adjacent the hinge about which the door assembly 10 can pivot. This guide rail member 25 is shaped and curved to permit the lowermost edge 22a of the windowpane 22 during the downward movement of the curved windowpane from the closed position towards the open position to progressively move generally straight downwards, to slightly deflect towards the inner door panel 12 and then to deflect towards the outer door panel 11 before the windowpane 22 reaches the open position, i.e. to travel in a generally S-shaped trajectory as best shown in FIG. 4.

In order to guide the curved windowpane 22 in the manner hereinabove described during the movement thereof between the closed and open positions, the slide member is employed, which member comprises an arm 27 operatively interconnecting the curved windowpane 22 and the guide rail member 25 in a manner which will now be described.

Figure 7:
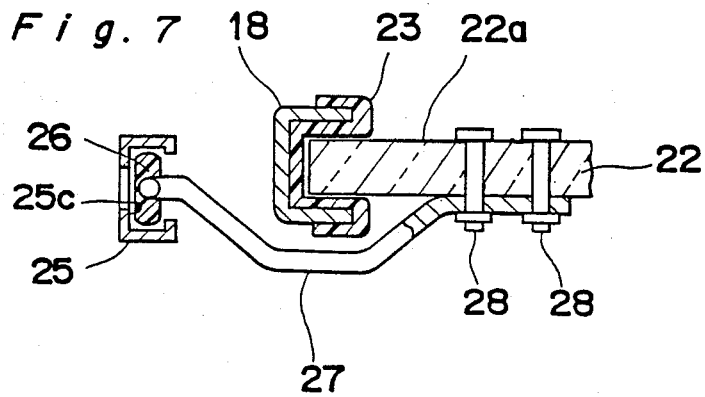
FIG. 7 is a cross-sectional view taken along the line VII—VII in FIG. 3, showing how a door windowpane is guided for movement up and down.

As best shown in FIG. 7, the arm 27 has one end rigidly secured, by the use of a plurality of fastening members 28 such as, for example, bolts, to a lowermost corner of the curved windowpane 22 and the other end carrying a roller 26 rotatably mounted thereon through a ball rigid with or integral with the other end of the arm 27. The roller 26 on the arm 27 is rollingly received in the guide groove 25c in the guide rail member 25 to facilitate smooth movement of the arm 27 relative to the guide rail member 25 during the movement of the windowpane 22 between the closed and open positions.

It is to be noted, that in view of the provision of the guide rail member 25 along which the windowpane 22 is guided through the slide member, that is, the arm 27 and the roller 26, the use of one or both of the channel members 18 may not be always essential in the present invention and can therefore be dispensed with. However, the use of the channel members 18 is advantageous in that the windowpane can be firmly retained when moved to the open position. Also, where an additional combination of the guide rail member 25 and the slide member is employed so that the guide rail members are positioned on respective sides of the windowpane 22 and are interconnected therewith through the slide members, the channel members 18 may be completely unnecessary.

In the structure so far described, assuming that the windowpane 22 is in the closed position having been upwardly out of the windowpane chamber 13, when an automobile driver, for example, causes the windowpane 22 to be moved downwards in an attempt to open the window, the windowpane 22 is first moved generally straight downwards, is deflected so as to approach the inner door panel 12 and is then deflected so as to move away from the inner door panel 12 and towards the outer door panel 11 before the lowermost edge 22a of the windowpane 22 reached a position immediately above the joint between the bottom edge of the outer door panel 11 and the bottom trim panel 12b. During this movement of the windowpane 22, the channel members 18 are pivoted first counterclockwise and then clockwise about the pivot point 20. This is possible because the channel members 18 are pivotably supported and because the guide rail member 25 is shaped and configured to allow the windowpane 22 to follow the generally S-shaped trajectory during the movement thereof.

An operation substantially reverse to that described above takes place when the windowpane 22 in the open position is moved towards the closed position.

For driving the windowpane up and down between the closed and open positions, any known windowpane drive means utilizing either a manually operable cranking knob or a powered window regulator may be employed in the present invention. However, in the illustrated embodiment, the windowpane drive means utilizing a cranking knob is employed, which will now be described with particular reference to FIGS. 3, 8 and 9.

As a matter of practice, the windowpane drive means is completely housed within the windowpane chamber 13 except for a cranking knob 36 exposed to the passenger's compartment so as to be accessible to a driver or a passenger thereto. The windowpane drive means includes a support strip 30 secured to the inner door panel 12 in a manner as will be described later and a pair of pulleys 31 and 32 rotatably mounted on opposite ends of said support strip 30. The pulleys 31 and 32 are spaced a distance determined in consideration of the stroke of movement of the windowpane 22 between the closed and open positions and have a traction cable 33 trained therebetween, opposite ends of said traction cable 33 being rigidly connected to the windowpane 22 in a manner as will be described later. The upper pulley 31 is operatively coupled to a drum (not shown) for rotation together therewith, which drum is in turn operatively coupled to the cranking handle 36 through a winding cable trained between the drum and the cranking handle 36. Thus, it will be readily understood that, when the cranking handle 36 is manually rotated in either one of the opposite directions, the traction cable 30 can be moved in a direction conforming to the direction of rotation of the cranking knob 36, accompanied by the corresponding movement of the windowpane 22.

At a generally intermediate portion of the lowermost edge 22a of the windowpane 22, a generally U-sectioned carrier plate 35 having a groove is secured to the windowpane 22 from below and bolted at 34 thereto. A plate portion of the carrier plate 35 confronting the inner door panel 12 has a ball-pointed pin 35a rigidly secured thereto, said ball-pointed pin 35a having a roller 35b rotatably and pivotally mounted thereon. The connection between the windowpane 22 and the opposite ends of the traction cable 33 is made at 33c, that is, by way of an anchor member fastened to or integral with the carrier plate 35.

The windowpane drive means also includes a generally C-sectioned guide frame 37 rigidly secured to the support strip 30 so as to extend parallel thereto and positioned rearwardly thereof with respect to the automobile body structure, said guide frame 37 having a guide groove 37a defined therein over the entire length thereof. The roller 35b rotatably and pivotally mounted on the ball-pointed pin 35a in the carrier plate 35 is rollingly engaged in the guide groove 37a of the guide frame 37 not only for guiding the windowpane 22 up and down, but also for keeping a generally constant spacing between the windowpane and the support strip 30. However, it is pointed out that the guide frame 37 and the associated parts such as the ball-pointed pin 35a and the roller 35b are not essential to the windowpane drive means employed in the present invention and can therefore be dispensed with.

Figure 8:
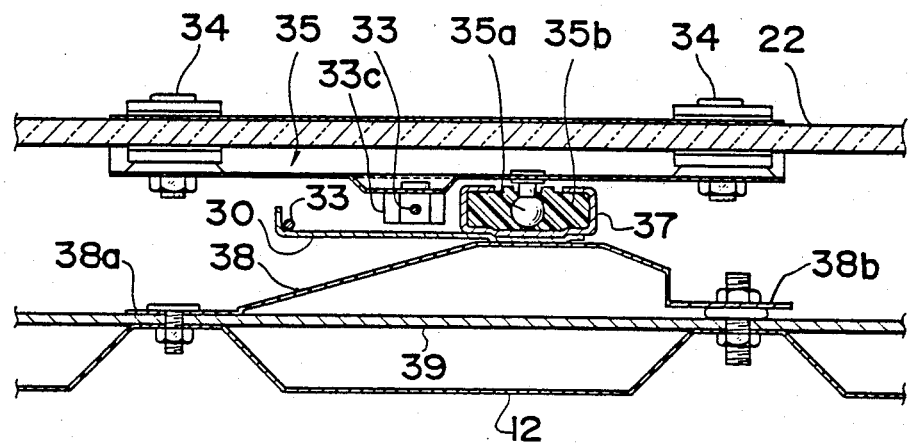
FIG. 8 is a cross-sectional view, on an enlarged scale, taken along the line VIII—VIII in FIG. 3.
Figure 9:
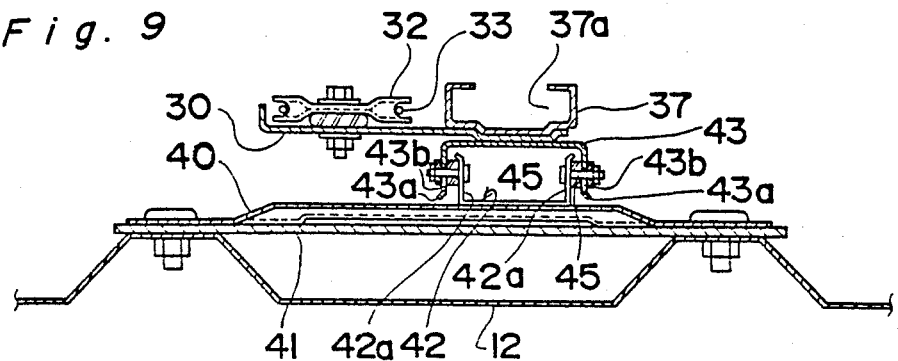
FIG. 9 is a cross-sectional view, on an enlarged scale, taken along the line IX—IX in FIG. 3.

The support strip 30 carrying the guide frame 37 is connected at an upper end thereof to the inner door panel 12 through a generally triangular plate 38 and at a lower end thereof to the inner door panel 12 through a generally rectangular fitting plate 40. More specifically, the triangular plate 38 has two fitting areas 38a and 38b occupying two of the apexes of the triangle. The fitting areas 38a and 38b of the triangular plate 38 are, while positioned on respective sides of the support strip 30, bolted to the inner door panel 12 with a back-up plate 39 intervening therebetween. A portion of the triangular plate 38 substantailly intermediate the fitting areas 38a and 38b has the upper end of the support strip 30 rigidly secured, or otherwise welded, thereto as best shown in FIG. 8.

The generally rectangular fitting plate 40 has its opposite ends bolted to the inner door panel 12 through a back-up plate 41 so as to lie generally perpendicular to the support strip 30. This fitting plate 40 carries a generally U-shaped bracket 42 welded, or otherwise bolted, thereto with a pair of arms 42a thereof protruding in a direction towards the support strip 30. Loosely coupled with this bracket 42 is a counter bracket 43 having a generally U-shaped configuration and rigidly secured, or otherwise bolted, to the support strip 30 on one side thereof just opposite the guide frame 37. The counter bracket 43 has a pair of arms 43a spaced a distance greater than the distance between the arms 42a of the bracket 42, each having a slot 43b defined therein so as to extend parallel to the longitudinal axis of an associated arm 42a. The brackets 42 and 43 are coupled together by means of connecting members 45 such as, for example, bolts and nuts or rivets, which loosely extend through the slots 43b so that the back and forth motion of the windowpane 22 which takes place relative to the inner door plate 12 during the movement thereof between the closed and open positions can be accomodated for by the free movement of the connecting members within the associated slots 43b.

In the present invention having been fully described, it is clear that, if the unique windowpane guide structure is not employed and the curved windowpane is merely allowed to move along a path curved to conform to the curvature of the windowpane, the bottom of the windowpane when the latter is moved to the open position would lie at a level, indicated by b in FIG. 4, higher with respect to the road surface than the position of the joint between the bottom edge of the outer door panel 11 and the bottom trim panel 12b. In such a case, when and so long as the windowpane is in the open position, an upper edge portion of the windowpane will protrude from the slot leading to the windowpane chamber and terminate at a level indicated by d in FIG. 4.

In contrast thereto, and in accordance with the present invention, the bottom of the windowpane when the latter is moved to the open position lies at a level indicated by a in FIG. 4, which level a is lower than the level b, and, therefore, the upper edge portion of the windowpane in the open position terminates at a level indicated by c which is also lower than the level d. Thus, the present invention is believed to be unique in that the space between the outer and inner door panels in the existing automobile door assembly is effectively utilized to permit the windowpane to be accomodated more fully in such a space.

Although the present invention has been described in connection with the preferred embodiments thereof with reference to the accompanying drawings, it is to be noted that various changes and modifications will become apparent to those skilled in the art. By way of example, although the upper ends of the respective channel members have been described and shown as rigidly secured to the inner door panel through the brackets, they may be rigidly secured to the back-up plate 39 if the latter extends widthwise of the windowpane.

Such changes and modifications are to be understood as included within the scope of the present invention as defined by the appended claims, unless they depart therefrom.

I claim:

1. A windowpane guide structure of a vehicle door assembly having a curved windowpane movable up and down for selectively closing and opening a window opening of the door assembly, spaced inner and outer door panels defining a windowpane chamber therebetween, and a slot in communication with the windowpane chamber and through which slot the windowpane moves up and down, and a bottom trim panel opposite the slot and connecting respective bottom edges of the outer and inner door panels, an outer joint between the bottom edge of the outer door panel and the bottom trim panel being located at a level lower than an inner joint between the bottom edge of the inner door panel and the bottom trim panel, and the bottom trim panel inclined upwardly from the outer joint towards the inner joint, which structure comprises:
   a windowpane drive means for driving the windowpane up and down between closed and open positions at which the window opening is closed and open, respectively;
   at least one guide rail member housed completely within the windowpane chamber and stationarily supported by the door assembly, said guide rail member having a generally S-shaped configuration as taken in a plane extending transversely to the inner and the outer door panels, said guide rail member extending in the direction of movement of the windowpane with one end of said guide rail member located adjacent the slot and the other end of said guide rail member extending from the inner door panel toward the outer door panel and terminating in the vicinity of said outer joint;
   a slide member operatively interconnecting the windowpane and the guide rail member; and
   said guide rail member progressively guiding the windowpane generally straight from the slot toward the bottom portion of the assembly, then slightly towards the inner door panel and then towards the outer door panel before the windowpane reaches the open position during the movement of the windowpane from the closed position toward the open position.

2. The structure as claimed in claim 1, further comprising supporting means for supporting the curved windowpane during the movement thereof between the closed and open positions, said supporting means comprising first and second channel members having a generally U-shaped cross section and housed completely within the windowpane chamber, each of said first and second channel members having a configuration different from that of the guide rail member and a lower end rockable in a plane extending transversely to the inner and the outer door panels.

3. The structure as claimed in claim 2, wherein each of said channel members has an upper end pivotably connected to the door assembly at a position adjacent the slot.

4. The structure as claimed in claim 3, wherein said channel members are spaced apart from each other and slidably receive opposite side edges of the windowpane, each of said channel members being curved in conformance with the curvature of the windowpane.

5. The structure as claimed in claim 3, further comprising a window sash member having a generally U-shaped configuration including a pair of arms, said sash member extending in the door assembly with the arms connected thereto at respective sides of the slot, and wherein the upper end of each of the channel members is pivotally connected to a respective said arm of the sash member at a location within the windowpane chamber.

6. The structure as claimed in claim 5, wherein said sash member has a generally U-shaped cross section, the cross section of the sash member being undersized relative to that of each said channel member, and the upper end of each said channel member being pivotally connected to the respective arm of the sash member in an overlapping relationship in which each said arm is positioned inside the associated channel member.

7. The structure as claimed in claim 3, further comprising a generally elongated reinforcement plate secured to the inner door panel and positioned within the windowpane chamber, and wherein the upper ends of the respective channel members are rigidly secured to opposite ends of said reinforcement plate.

8. The structure as claimed in claim 3, wherein the upper end of each of the channel members is positioned close to and inwardly of the slot with respect to the windowpane chamber.

9. The structure as claimed in claim 3, wherein the drive means includes a support strip oscillatorily supported by the door assembly.

10. The structure as claimed in claim 2, wherein each of the channel members is curved in conformance with the curvature of the windowpane, and the slide member secured to the windowpane slidably engages the channel member.

11. The structure as claimed in claim 4, wherein the guide rail member is positioned on one side of the first channel member remote from the second channel member, said first channel member being positioned forwardly of said second channel member with respect to automobile body structure to which the door assembly is to be fitted, and wherein said slide member extends between the windowpane and the guide rail member around the first channel member.

12. The structure as claimed in claim 6, wherein the upper end of each of the channel members comprises opposite walls flared outwardly away from each other and receiving the associated arm of the sash member therein.

13. The structure as claimed in claim 9, wherein a lower end of the support strip is connected to the door assembly through a pair of brackets, said brackets having respective fitting holes defined therein and also having a connecting pin member extending through the fitting holes in said respective brackets, at least one of said fitting holes elongated in a direction extending between the inner and the outer door panels.

14. The structure as claimed in claim 5, further comprising a weatherstrip lining the inside of the sash member and also the inside of each of the channel members while continuously extending from the first channel member to the second channel member via the sash member.

15. The structure as claimed in claim 1, wherein the guide rail member and the slide member are each provided with a twisting load absorbing portion for absorbing a twisting load which would act on both the guide rail member and the slide member when the windowpane is guided by the guide member.

16. The structure as claimed in claim 15, wherein the guide rail member has a guide groove defined therein over the length thereof, and said slide member has a roller rotatably mounted thereon and engaged with said guide rail member in said guide groove of the guide rail member.

* * * * *